US008027256B1

(12) United States Patent
Subramanian et al.

(10) Patent No.: US 8,027,256 B1
(45) Date of Patent: Sep. 27, 2011

(54) MULTI-PORT NETWORK DEVICE USING LOOKUP COST BACKPRESSURE

(75) Inventors: Krishnamurthy Subramanian, Mountain View, CA (US); Amrik Baines, Livermore, CA (US); Manu Thomas, Milpitas, CA (US); Jason Lee, Palo Alto, CA (US); Ajoy Aswadhati, Cupertino, CA (US)

(73) Assignee: Force 10 Networks, Inc., San Jose, CA (US)

( * ) Notice: Subject to any disclaimer, the term of this patent is extended or adjusted under 35 U.S.C. 154(b) by 1215 days.

(21) Appl. No.: 11/142,998

(22) Filed: Jun. 2, 2005

(51) Int. Cl.
*G01R 31/08* (2006.01)
*H04J 1/16* (2006.01)

(52) U.S. Cl. .......... 370/231; 370/235; 370/237

(58) Field of Classification Search ............ 370/351, 370/389, 390, 391, 229, 230, 230.1, 232, 370/233, 234, 235, 235.1, 236, 241, 249, 370/412, 357, 360, 413; 379/90.01, 106.01, 379/106.03, 106.08, 111, 114.01, 121.01, 379/124
See application file for complete search history.

(56) References Cited

U.S. PATENT DOCUMENTS

| 6,259,698 | B1 * | 7/2001 | Shin et al. ........... 370/395.7 |
| 6,687,247 | B1 * | 2/2004 | Wilford et al. ............ 370/392 |
| 6,798,744 | B1 * | 9/2004 | Loewen et al. ............ 370/235 |
| 6,856,595 | B1 * | 2/2005 | Brown ...................... 370/229 |
| 7,324,452 | B2 * | 1/2008 | Xu et al. .................. 370/236 |
| 7,542,425 | B2 * | 6/2009 | Grant et al. ............... 370/236 |
| 2002/0110122 | A1 * | 8/2002 | Ramfelt et al. ............ 370/389 |
| 2003/0058880 | A1 * | 3/2003 | Sarkinen et al. .......... 370/413 |
| 2003/0133447 | A1 * | 7/2003 | Benayoun et al. ......... 370/360 |
| 2003/0147347 | A1 * | 8/2003 | Chen et al. ............... 370/229 |
| 2003/0185155 | A1 * | 10/2003 | Huang et al. .............. 370/235 |
| 2004/0062261 | A1 * | 4/2004 | Zecharia et al. .......... 370/419 |
| 2004/0085978 | A1 * | 5/2004 | Bly et al. .................. 370/412 |
| 2004/0160970 | A1 * | 8/2004 | Dally et al. ............... 370/412 |
| 2004/0257991 | A1 * | 12/2004 | Sterne et al. .............. 370/230 |
| 2005/0100011 | A1 * | 5/2005 | Chiruvolu et al. ......... 370/389 |
| 2006/0008063 | A1 * | 1/2006 | Harnesk et al. .......... 379/114.01 |
| 2006/0098672 | A1 * | 5/2006 | Schzukin et al. .......... 370/412 |
| 2006/0187827 | A1 * | 8/2006 | Smith et al. .............. 370/229 |

* cited by examiner

*Primary Examiner* — Ricky Ngo
*Assistant Examiner* — Paul Masur
(74) *Attorney, Agent, or Firm* — Robert Schuler

(57) ABSTRACT

In one embodiment of a network device, multiple packet sources contend for access to a packet processing pipeline. The packet processing pipeline tracks the usage of lookup resources by each of the multiple packet sources. When a packet source is detected to be using more than an acceptable allocation of the lookup resources, access to the packet processing pipeline for that source is limited or curtailed to bring that source back within an acceptable allocation of resources. This backpressure mechanism can be used to control sources that, although within a bandwidth limit, are submitting a packet type mix that is consuming unfair percentages of lookup resources in an oversubscribed system. Other embodiments are described and claimed.

23 Claims, 6 Drawing Sheets

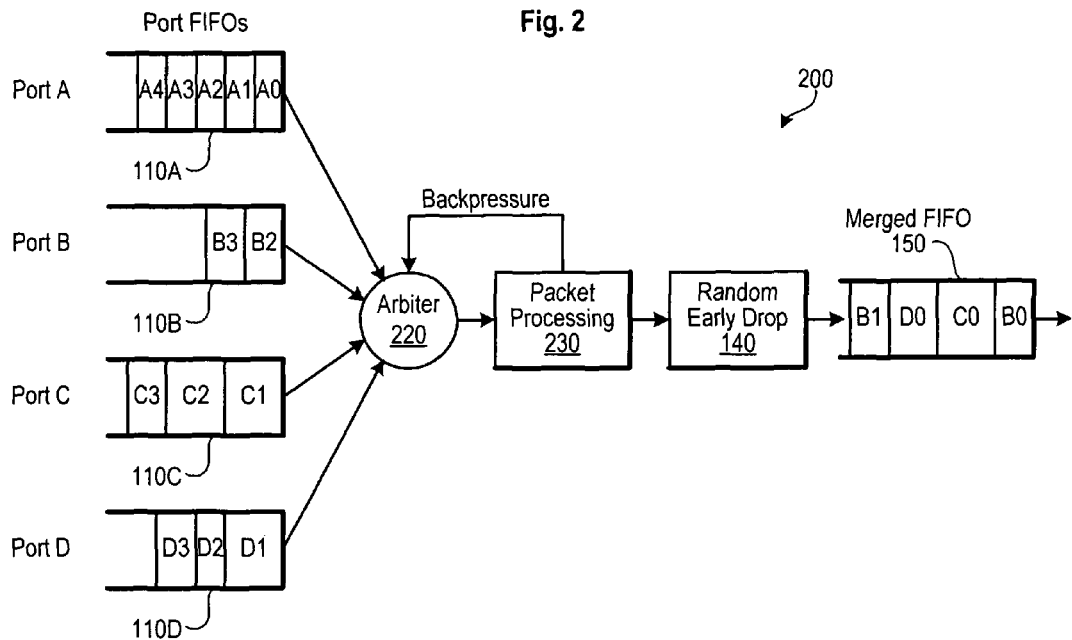
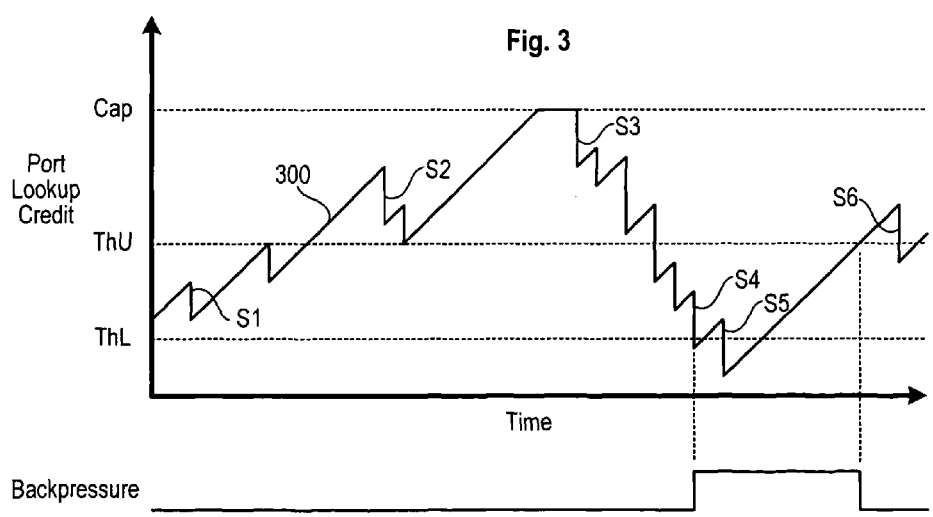

MULTI-PORT NETWORK DEVICE USING LOOKUP COST BACKPRESSURE

BACKGROUND

1. Field of the Invention

This invention relates generally to packet network devices, and more particularly to a method and apparatus for traffic management within such a device based on lookup cost.

2. Description of Related Art

Packet network devices receive and send data in finite-length packets. A packet generally encapsulates the data in a payload section, with one or more header sections providing instructions for delivery and interpretation of the payload. Multi-port packet network devices such as switches and routers use a variety of schemes to direct packets along a network path from a sender to a destination. Virtually all of these schemes involve reading at least one packet header from each packet, and interpreting the header information in order to forward each packet towards its destination. Depending on the types of headers used, one or more headers may also be modified before the packet is forwarded.

FIG. 1 shows a section of a prior art network device 100. The illustrated section of network device 100 processes packets received on four different ports A-D. Each port connects to a port FIFO (First-In First-Out buffer) capable of queuing packets while the packets await processing. Four port A packets A1, A2, A3, A4 are shown in port FIFO 110A, three port B packets B1, B2, B3 are shown in port FIFO 110B, three port C packets C1, C2, C3 are shown in port FIFO 110C, and three port D packets D1, D2, D3 are shown in port FIFO 110D.

An arbiter 120 selects packets from port FIFOs 110A-D according to an arbitration scheme that apportions access to the device among the ports. Arbiter 120 passes the selected packets to packet processing 130, where forwarding actions and packet modifications are performed.

Many switches are capable of operation in an "oversubscribed" bandwidth configuration. In FIG. 1, for example, device 100 may be designed with a merged FIFO 150 that can merge data from only three input ports at full line rate, and yet four ports are served. As long as each of the four ports receives with 75% average utilization or less, device 100 can process all traffic received. There may be some time periods, however, where near-line-rate traffic is received on all four ports at once. When this occurs, some sort of dropping mechanism is needed to manage traffic intelligently. Random early drop unit 140 provides such a service by sensing impending congestion in the device, and randomly dropping packets when congestion is imminent. Sophisticated devices have the capability to determine which of the input ports are exceeding an assigned bandwidth profile, and increase the probability that a packet from an out-of-profile port will be dropped should dropping be necessary.

In FIG. 1, processed packets are queued in merged FIFO 150 to await forwarding to their assigned output ports. FIFO 150 did not have sufficient buffer space for processed packets A0, B0, C0, and D0. Accordingly, random early drop unit 140 selected packet C0 and dropped that packet to keep the device within its capacity limits.

SUMMARY OF THE INVENTION

Random drop mechanisms deal adequately with bandwidth congestion in oversubscribed systems. It has now been found, however, that in some circumstances an "in-profile" port may cause congestion in packet processing, due, e.g., to the relative difficulty of processing packets received on that port. For instance, a layer-2 switched packet may consume fewer packet processing resources than an Internet Protocol (IP) version 4-routed packet consumes, and the IP version 4-routed packet in turn consumes fewer resources than an IP version 6-routed packet. In such circumstances, the packet processing resources may be designed to support a specific mix of packet types at a given line rate. Should the device receive a more difficult mix of packet types, packet processing would in effect become "oversubscribed," even though most or all ports are operating "in-profile" from a bandwidth perspective. Various embodiments of the present invention address this problem by throttling a port that is requiring more than its expected share of the processing resources.

In one embodiment, a lookup engine performs lookup operations for packets received from multiple packet buffers. When the lookup engine is devoting more than an allowed share of its resources to performing lookup operations for packets received from one (or more) of the buffers, a backpressure channel is activated. The backpressure channel requests a reduction in the relative rate of packets submitted to the lookup engine from the offending buffer or buffers.

BRIEF DESCRIPTION OF THE DRAWINGS

The invention may be best understood by reading the disclosure with reference to the drawings, wherein:

FIG. 2 illustrates a section of a packet network device that uses a backpressure channel to throttle ports that are more than an allowable share of available packet processing resources;

FIG. 3 contains a time plot for port lookup credit and backpressure in an embodiment of the present invention;

DETAILED DESCRIPTION

The following disclosure describes several embodiments of a packet network device subsystem, without presenting the well-known details for other subsystems of such a device. Those skilled in the art recognize that many packet network device architectures include ingress ports and accompanying processing, a switching core, and egress ports and accompanying processing. The disclosed embodiments can be implemented, e.g., to manage a group of ingress ports, a group of switching core ports, or a group of egress ports. One device may have repeated instances of such a subsystem, for different types of ports, and/or for different groups of the same type of ports.

Figure 1:
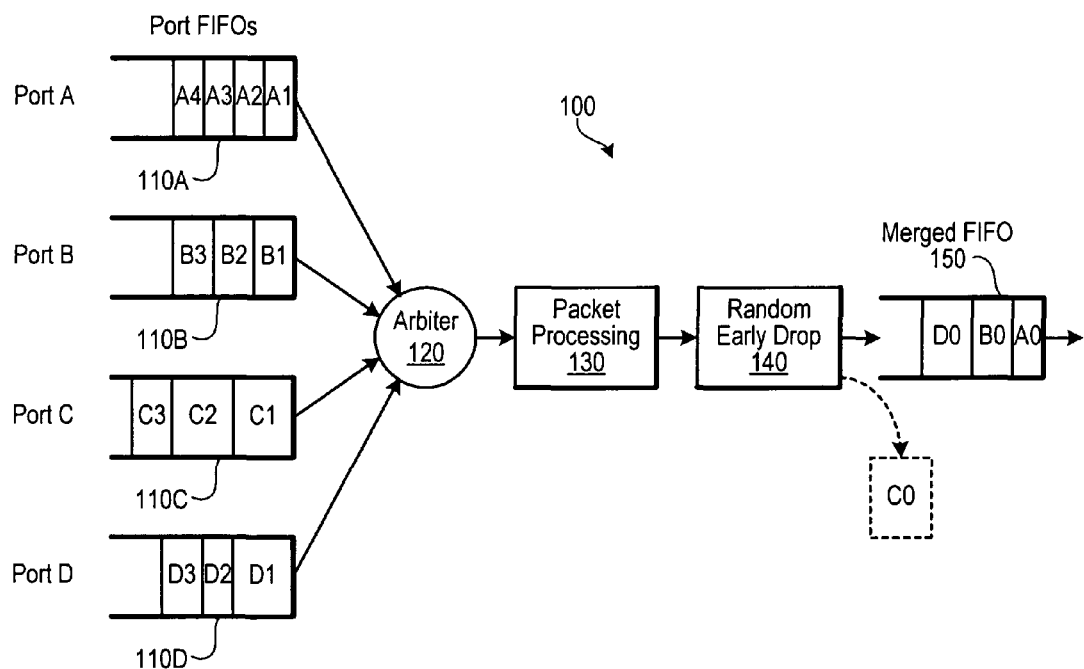
FIG. 1 illustrates a section of a prior art packet network device that uses random early drop to manage traffic congestion.

FIG. 2 presents a section of a packet network device 200 according to a first embodiment of the present invention. A group of port FIFOs 110A-D, a random early drop unit 140, and a merged FIFO 150 can be similar to corresponding elements of FIG. 1. An arbiter 220 selects packets from the port FIFOs according to an arbitration scheme, which is assumed for this example to nominally act as a round-robin scheduler that allocates equal bandwidth to each input port. Arbiter 220 supplies the scheduled packets to a packet processing unit (PPU) 230.

PPU 230 spends some amount of time processing each packet received from the arbiter. Generally, at least part of this time can vary for different types of packets, and is not directly related to payload length. Depending on the mix of packet types and packet lengths selected by arbiter 220, it is possible for the PPU to fall behind, even though for a different mix of packet types and packet lengths the PPU is capable of handling a similar data bandwidth.

Although in practice each port may receive packets of many different types, in one scenario assume that port A receives IPv6 routed packets, port B receives packets that can be switched at layer 2, and ports C and D receive IPv4 routed packets. PPU 230 may incur a relative cost of 3, 5, and 10 "cost units" to process layer 2-switched packets, IPv4-routed packets, and IPv6-routed packets, respectively. Also, as illustrated the port A packets are smaller than port B packets, and the average size of port C and D packets is larger yet. Thus considering average packet size, the number of cost units required to process the same data length of packet input from each port could be 60 for port A, 15 for port B, 15 for port C, and 20 for port D.

In the present invention, PPU 230 can influence the arbiter port selection using a backpressure channel. For instance, 25 cost units can be allocated to each port for the given data length, meaning that 100 cost units are available for the ports considered in aggregate. In the example above, the mix of packet types and lengths requires 110 cost units, more than PPU 230 can provide in the given time frame. The PPU 230 tracks individual cost unit usage by packets from each port and determines that one port, port A, is using substantially more than its 25 cost units. PPU 230 thus activates the backpressure channel to notify arbiter 220 to throttle port A. With port A selected by the arbiter at a reduced rate, PPU 230 can keep cost unit consumption below capacity.

In different embodiments, throttling a source can take different approaches. For instance, a source can be blocked completely until it receives enough credits to be restored to arbitration. Or, the throughput allowed from port A may be changeable in increments to achieve an acceptable cost unit consumption.

As shown in FIG. 2, the contents of merged FIFO 150 indicate that port A has been temporarily skipped due to excess PPU usage. It is noted that bandwidth congestion may or may not exist separate from excess PPU usage, and can still be dealt with using random early drop unit 140, or via other techniques that will be described later in conjunction with FIG. 7.

FIG. 3 graphically illustrates one implementation of a cost/credit approach to allocating PPU usage. Assume that PPU 230 maintains a lookup credit account for port A. The number of credits resident in this account is represented by the graphed port lookup credit line 300. Lookup credit 300 generally increases over time, as credits are allocated steadily to port A. Although the increase is shown as a continuous ramp, generally discrete credit amounts accrue at discrete points over time in a digital implementation.

At various points, lookup credit 300 takes downward steps, some of which are labeled S1, S2, etc. Each step represents the lookup cost for a port A packet received by PPU 230. Steps S2 and S3 are shown larger than step S1, representing an increased lookup cost for the step S2 and S3 packets. Generally, lookup credit 300 will observe a net increase during time periods where port A packets are using less than their allocation of lookup resources. During times of net decrease, such as between steps S3 and S5, port A packets are using more than their allocation of lookup resources.

Three thresholds—Cap, ThU, and ThL—are illustrated in the FIG. 3 graph. Cap represents a maximum credit balance that a port may obtain. Many network sources exhibit bursty behavior, i.e., some periods of high activity are interspersed with periods of low activity. During periods of low activity, lookup credit 300 may grow unbounded, thereby allowing port A to demand unfair lookup resources during an extended later burst. Therefore it is desirable to have unused credits "expire" after some period of non-use. The institution of a cap is one way to implement such an expiration concept.

ThL represents a low credit threshold. When the port lookup credit decreases below this threshold, as it does at step S4, a backpressure signal is triggered to alert, e.g., arbiter 220 that port A should be throttled. Although ThL could be set to any value, in FIG. 3 it is shown as a slightly positive value. This allows for a circumstance where latency in the backpressure channel may have already allowed additional port A packets to pass the arbiter. Thus in FIG. 3, the packet represented by step S5 had been passed by arbiter 220 before the backpressure signal was activated, but was not processed until afterwards.

ThU represents an upper credit threshold. This threshold represents a nominal credit amount that should build within a lookup credit account for a backpressured port, prior to the backpressure signal being deasserted. By coordinating ThL, ThU, and the credit replenishment rate, a minimum backpressure time can be assured for any backpressured port. Although ThU is not strictly necessary, without it some implementations may not hold the backpressure signal long enough to cause a delay on a lookup-resource-demanding port.

As shown at step S6, once ThU is exceeded the backpressure signal will not be reactivated by dropping below ThU, until lookup credit 300 drops below ThL again.

Figure 4:
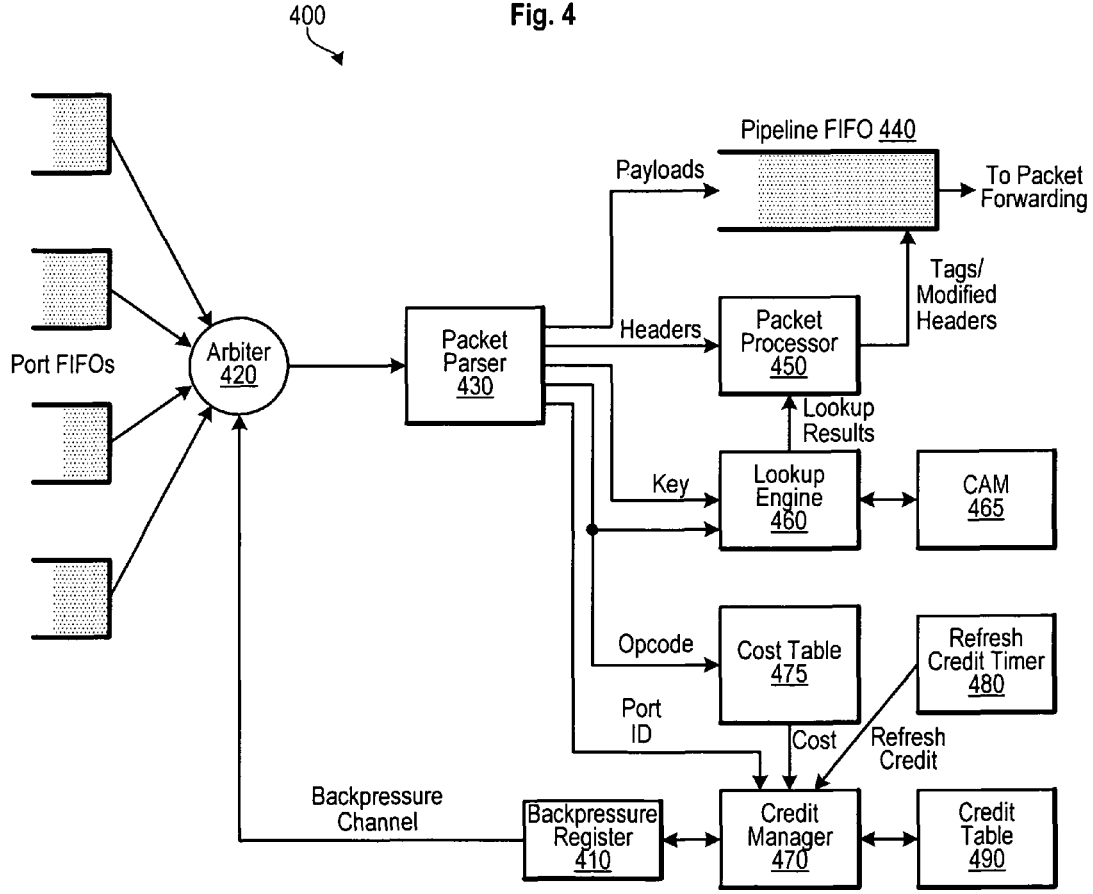
FIG. 4 depicts a lookup cost backpressure system based on estimated lookup costs stored in a cost table.

FIG. 4 shows a more specific implementation 400 of an embodiment that implements a cost/credit approach to lookup backpressure. An arbiter 420 sequences packets from multiple port FIFOs to a packet parser 430. Packet parser 430 examines packets it receives to determine their type. The payload (and generally also the headers) are placed in a pipeline FIFO 440, while a copy of the headers is supplied to a packet processor 450. Packet parser 430 also produces one or more partial or complete lookup keys, and a packet opcode.

A lookup engine 460 receives the key and opcode. Based on these inputs, lookup engine 460 consults one or more tables stored, e.g., in a content addressable memory (CAM) 465. Lookup results may comprise a next-hop destination and/or instructions that packet processor 450 will use to modify the headers and insert a temporary tag header on the packet while it is still resident in pipeline FIFO 440. Modified and tagged packets exit FIFO 440 and are passed to a packet forwarding section of the device (not shown).

Each time parser 430 supplies an opcode to lookup engine 460, parser 430 also supplies the opcode to a cost table 475. Cost table 475 is configured with an array of estimated costs, preferably proportionally related to the cost of lookup operations in lookup engine 460 for a packet with the same opcode. When parser 430 supplies an opcode to cost table 475, cost table 475 outputs a corresponding estimated cost to a credit manager 470. Packet parser 430 also supplies a port ID to credit manager 470, the port ID representing the port FIFO from which arbiter 420 accepted the packet that resulted in the opcode.

When credit manager 470 receives a cost and port ID, it accesses a lookup credit account corresponding to the port ID in a credit table 490. The account is debited by the cost, and compared to backpressure thresholds, e.g., as described above with regard to FIG. 3.

A backpressure register 410 contains backpressure status flags corresponding to each port ID. When credit manager 470 determines that a backpressure status flag should be modified (e.g., set or unset), the corresponding flag in register 410 is modified. A backpressure channel conveys the status flag values from backpressure register 410, or some abstraction based on those flag values, to arbiter 420.

A refresh credit timer 480 is used to provide refresh credits to the accounts for each port ID in credit table 490. Refresh credit timer counts for a specified refresh time and then supplies a specified refresh credit to credit manager 470. The credit can pertain to a specific port, or credits for all ports can be issued simultaneously.

Figure 5:
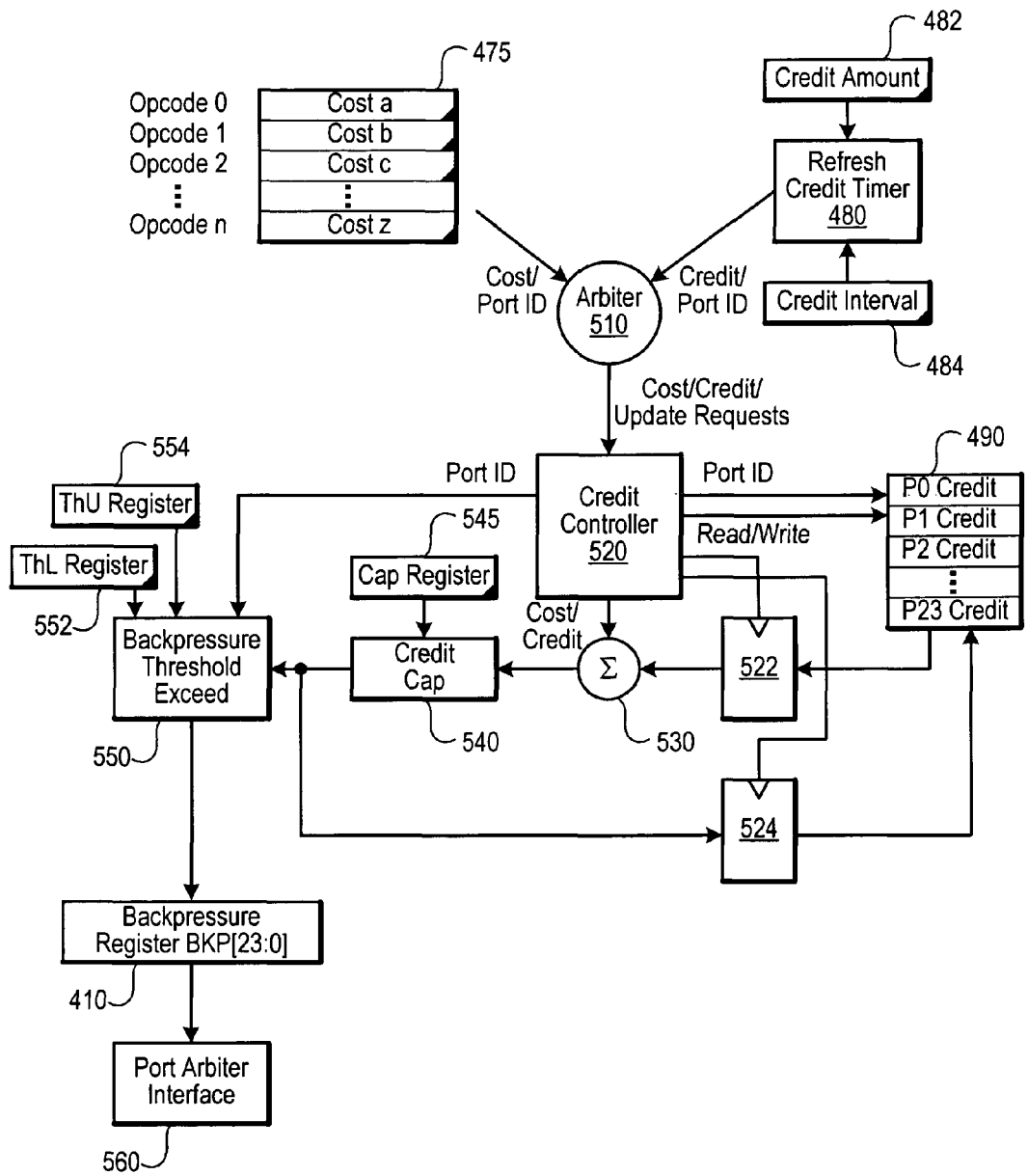
FIG. 5 contains a detailed block diagram for a credit management system useful in the FIG. 4 embodiment.

FIG. 5 contains further details for the circuit elements central to credit management and backpressure. First, lookup cost table 475 is addressable by opcodes 0 to n, each opcode defining a particular differentiated packet type for packet lookup. Each opcode accesses a corresponding register in table 475 that contains a corresponding cost. It is noted that several opcodes can be assigned the same cost. The registers can be loaded with cost values, e.g., that either relate directly to lookup cost, or indirectly so. For instance, each subscriber may be allowed a certain profile bandwidth but only be guaranteed a certain number of IPv6 packets per second, regardless of bandwidth. The relative lookup cost for the IPv6 packet opcode can be set to backpressure a subscriber's input port when this IPv6 packet rate is exceeded.

Refresh credit timer 480 is shown with two associated registers, a credit amount register 482 and a credit interval register 484. At the beginning of each refresh interval, refresh credit timer 480 loads the value from credit interval register 484 into an internal countdown timer, and begins counting down. When the timer value reaches zero, timer 480 issues a credit request for the amount of credit stored in credit amount register 482. As shown, refresh credit timer 480 supplies both a credit and a corresponding port ID to be refreshed. The port ID can be obtained from a counter that cycles through all possible port IDs, one per refresh interval. Alternately, a single request can be issued for all ports, with another unit responsible for stepping through all ports to perform credit updates. The credit interval and credit amount can be adjusted to relate to the available lookup engine throughput.

FIG. 4 credit manager 470 is expanded in FIG. 5 as several interoperating components, including a cost/credit arbiter 510, a credit controller 520, a port credit read register 522 and a port credit write register 524, an adder 530, a credit cap (ceiling function) unit 540 and associated cap register 545, and a backpressure threshold exceed unit 550 and associated ThL and ThU registers 552 and 554. Each will be explained in turn.

Cost/credit arbiter 510 receives cost/credit update requests from two sources. The first source is the FIG. 4 packet parser 430 and lookup cost table 475. The second source is refresh credit timer 480. Arbiter 510 interleaves the requests from both sources and submits them to credit controller 520 for processing.

When credit controller 520 receives a cost/credit update request, it supplies a read command signal and the request port ID as an address to credit table 490 (FIG. 5 shows an implementation supporting up to 24 ports with corresponding credit accounts P0-P23). Credit table 490 supplies the corresponding port credit to read register 522, which latches the port credit. Adder 530 then adds (or subtracts, as appropriate) the credit or cost supplied with the pending update request to the value stored in register 522, and supplies the sum to credit cap unit 540. Credit cap unit 540 supplies the lesser of the cap register 545 value and the adder 530 output to backpressure threshold exceed unit 550 and to write register 524. Credit controller 520 latches the credit cap 540 output and then supplies a write command to credit table 490 to write the new credit value for the current port ID back to table 490.

When backpressure threshold exceed unit 550 receives a credit value and corresponding port ID, it performs two credit value comparisons—one with the value stored in ThU register 554, and the other with the value store in ThL register 552. When the credit value is less than ThL, the backpressure register flag for port ID is set. When the credit value is greater than ThU, the backpressure register flag for port ID is cleared. For instance, backpressure register 410 can store a 24-bit value as a one-bit-wide by m-port array BKP[23:0]. Backpressure threshold exceed unit 550 manipulates the appropriate bit in BKP[23:0] when a threshold is passed.

The last element shown in FIG. 5 is a port arbiter interface 560. Interface 560 repeatedly reads BKP[23:0] and transmits it to the FIG. 4 port arbiter.

In one embodiment, blocks 475, 482, 484, 545, 552, and 554 are implemented as Peripheral Component Interconnect (PCI) configuration registers. The integrated circuit on which the FIG. 5 circuitry resides is provisioned with a PCI controller (not shown). A management unit located somewhere else in the device can then connect to the integrated circuit over a PCI bus to set or adjust the costs, thresholds, and other adjustable parameters.

Figure 6:
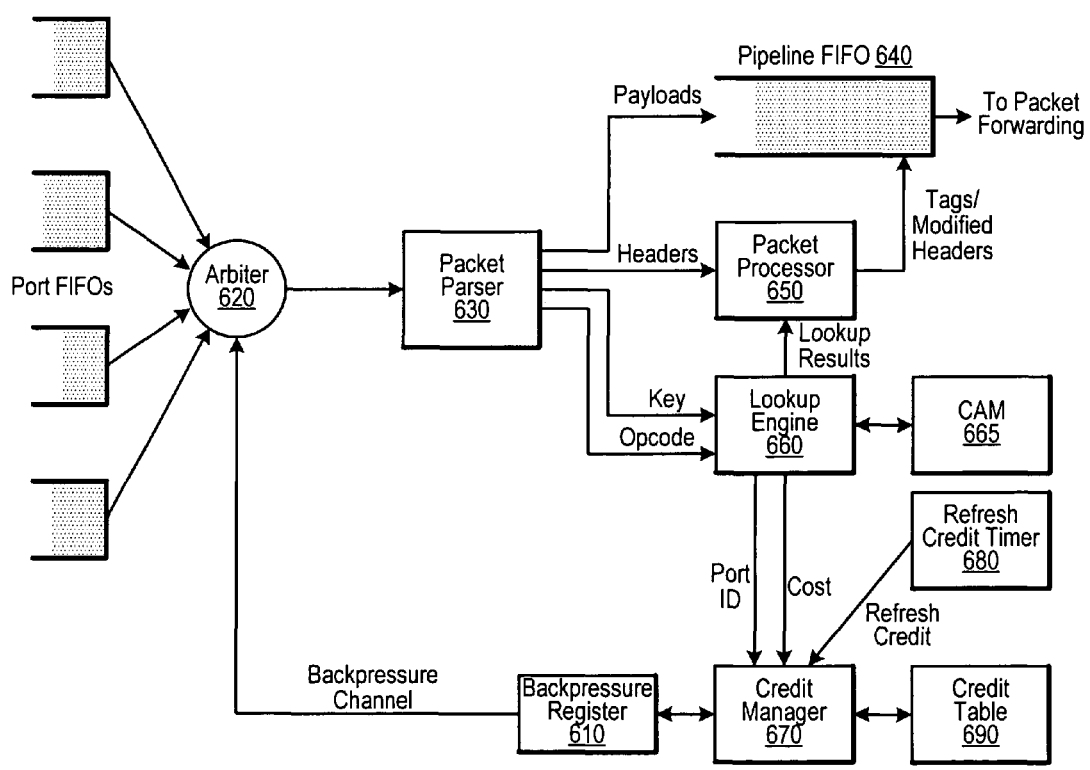
FIG. 6 depicts an alternate embodiment for a lookup cost backpressure system based on actual lookup costs.

FIG. 6 illustrates an alternate embodiment 600 similar to the FIG. 4 embodiment. A lookup engine 660 contains timing logic to physically measure the amount of time spent performing lookup operations for each packet. Lookup engine 660 supplies the measured lookup time and port ID to a credit manager 670 after lookup for a packet is completed. Credit manager 670 operates as previously described, except based on actual lookup costs instead of estimated costs.

Figure 7:
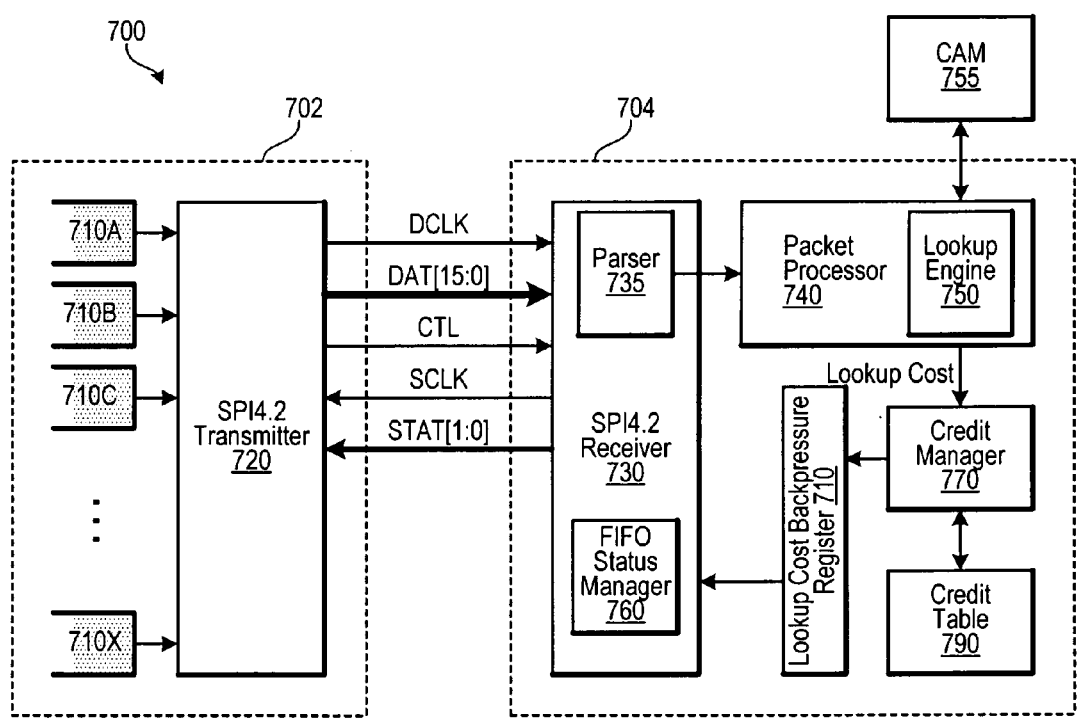
FIG. 7 illustrates an embodiment that implements lookup cost backpressure across an SPI-4.2 bus.

FIG. 7 illustrates a device implementation 700 that operates across a bus system connecting two integrated circuits 702 and 704. The bus system connecting circuits 702 follows the System Packet Interface Level 4 (SPI-4) Phase 2 Revision 1 implementation agreement OIF-SPI-4-02.1, promulgated by the Optical Internetworking Forum, referred to herein as SPI-4.2. Circuit 702 comprises 24 port buffers 710A to 710X and an SPI-4.2-compliant transmitter 720. Circuit 704 comprises an SPI-4.2-compliant receiver 730 with a parser 735 and a FIFO status manager 760, a packet processor 740 comprising a lookup engine 750, a credit manager 770, a credit table 790, and a lookup cost backpressure register 710. A CAM 755 stores tables with lookup entries for lookup engine 750. Packet processor 740, lookup engine 750 and CAM 755, credit manager 770, credit table 790, and lookup cost backpressure register 710 can operate, e.g., according to one of the previously described embodiments.

An SPI-4.2 bus system connects SPI-4.2 transmitter 720 with SPI-4.2 receiver 730. The bus system comprises a 16-bit-wide data bus DAT[15:0], a control line CTL, a data clock DCLK, a two-bit-wide status bus STAT, and a status clock SCLK. DAT, CTL, and DCLK signals originate at SPI-4.2 transmitter and terminate at SPI-4.2 receiver 730. STAT and SCLK originate at SPI-4.2 receiver 730 and terminate at SPI-4.2 transmitter 720.

Data bus DAT transfers 16 bits of packet data (eight if only one octet remains in a packet) or a control word each clock cycle. When CTL is asserted, DAT contains a control word to be interpreted by SPI-4.2 receiver 730. When CTL is deasserted, DAT contains packet data. Packet data is transmitted in bursts, with a control word immediately preceding and immediately following each data burst. The control word preceding a data burst indicates whether the following data burst is the start of a new packet or a continuation of a previously partially transmitted packet, and also indicates the port address of the following data burst. The control word immediately following a data burst indicates if the data burst contained an end of packet.

The status bus STAT is used to convey flow control information to SPI-4.2 transmitter 720. In a standard SPI-4.2 implementation, the flow control information is related to receive buffers (not shown) associated with the SPI-4.2 receiver. Each receive buffer reports whether it is "starving," "hungry," or "satisfied," depending on buffer fullness. The status bus STAT transmits receive buffer status as a two-bit flow control word, where 00 represents starving, 01 represents hungry, and 10 represents satisfied. STAT repeatedly transmits a definable structure known as a calendar, consisting of a sync word (11), followed by at least one flow control word for each port in a defined sequence, followed by a parity word. The flow control words are updated for each calendar cycle.

In device 700, the forward bus path and flow control bus path operate according to the SPI-4.2 standard, but the FIFO status manager 760 in SPI-4.2 receiver 730 is modified so as to refer to lookup cost backpressure register 710. Normally, an SPI-4.2 FIFO status manager would examine receive buffer fullness and construct a STAT bus calendar based on buffer fullness. In device 700, FIFO status manager 760 still reports buffer fullness. In addition, however, FIFO status manager 760 examines lookup cost backpressure register 710 when constructing a calendar. For each backpressure register 710 flag that is set, FIFO status manager sets the corresponding calendar entry to "satisfied," regardless of buffer fullness. SPI-4.2 transmitter 720 interprets a satisfied calendar entry as a request to send no more data for that port.

Each of the discussed modes for backpressuring can be viewed as affecting or weighting the arbitration success of a packet buffer that contends with other packet buffers for access to lookup resources. In a binary mode, a backpressured buffer can be skipped entirely in round-robin multiplexing, or visited less frequently, or visited for shorter durations. Finer-grained backpressure information can also be used to adjust the effective bandwidth granted a backpressured buffer by an arbiter. Although conceptually the relative bandwidth granted a buffer can be couched in terms of an arbitration success probability, an arbiter need not deal explicitly with statistics to affect probability.

Many other variations of the embodiments described above exist, a few of which will now be briefly mentioned. First, instead of a cost/credit approach, a filtered version of lookup resource usage can be calculated to represent an average usage for each buffer, e.g., using an exponential filter with a selected time constant. When average lookup resource usage exceeds a threshold, the corresponding port can be backpressured until its average lookup resource usage comes down.

Although in many cases all ports will be treated equally, it is also possible to institute different lookup resource constraints for individual ports or port groups. Some ports can be unconstrained in an embodiment. A cost table can also be constructed with entries that depend not only on packet type or opcode, but also port ID (lookup costs do not have to translate explicitly to lookup resources used). Alternately, different backpressure thresholds or credit refresh rates can be stored for each port. Cost or threshold can also be a function of aggregate lookup resource usage—in other words, lookup resources can be "cheapened" when the lookup engine is lightly loaded, and increasingly valued as lookup engine demands approach the point of oversubscription.

One of ordinary skill in the art will recognize that the concepts taught herein can be tailored to a particular application in many other advantageous ways. For instance, although the use of a refresh credit timer is shown, the credit table can alternately be implemented with registers that are also upcounters, and which automatically increase up to a maximum as a function of time. Two packet buffers need not be physically separated to be different buffers, but can be, e.g., logically separated. Although specific implementations use a binary interpretation of lookup resource usage to create backpressure, more extensive information and/or multiple threshold information can be used to balance lookup resource sharing. The particular functional block descriptions described herein apply to some embodiments, and could be advantageously modified for use in different systems.

Although the specification may refer to "an", "one", "another", or "some" embodiment(s) in several locations, this does not necessarily mean that each such reference is to the same embodiment(s), or that the feature only applies to a single embodiment.

What is claimed is:

1. A packet network device comprising:
   multiple packet port buffers, at least one of which is assigned a lookup credit which is a relative cost associated with lookup operations performed by a lookup engine over a fixed period of time on a packet data type;
   an arbiter for selecting packet data from the multiple packet port buffers; a packet processor;
   a lookup credit manager to maintain a lookup credit account associated with the at least one packet port buffer which is assigned the lookup credit, the lookup credit account credited with the costs of the lookup operations and storing a current lookup credit value;
   the lookup engine performing the lookup operations for packets received from the arbiter and sending the results of the lookup operations to the packet processor which the packet processor uses to modify at least one of the received packets and to send the cost of the lookup operations to the lookup credit manager; and
   a backpressure channel to request the arbiter to reduce the relative rate of packets submitted to the lookup engine from the at least one packet port buffer that is assigned the lookup credit when the lookup credit value in the lookup credit account assigned to the at least one packet port buffer falls below a lower credit threshold.

2. The packet network device of claim 1, wherein the credit manager adjusts the lookup credit account by a lookup cost when the lookup engine performs a lookup operation for a packet received from the first packet port buffer, the credit manager recurrently replenishing the first lookup credit account at a rate reflecting an allowable consumption of lookup resources for the first packet buffer, wherein the backpressure channel requests for reduction in a relative rate of packets are based on the value of the first lookup credit account.

3. The packet network device of claim 2, further comprising:
   a parser to determine a packet type for packets submitted to the lookup engine; and
   an estimator to estimate the lookup cost from the packet type.

4. The packet network device of claim 3, wherein the estimator comprises a lookup engine cost lookup table indexed by packet type.

5. The packet network device of claim 2, wherein the lookup engine calculates the lookup cost for the packet when the lookup engine performs the lookup operation for that packet.

6. The packet network device of claim 2, wherein the credit manager maintains a corresponding lookup credit account for each of the multiple packet port buffers, and wherein the backpressure channel submits requests for reduction in a relative rate of packets for each of the multiple packet buffers based on the value of the corresponding lookup credit account.

7. The packet network device of claim 2, further comprising a backpressure threshold circuit, the backpressure threshold circuit signaling the backpressure channel to request a reduction in the relative rate of packets when the value of the first lookup credit account drops below a lower threshold.

8. The packet network device of claim 2, the credit manager comprising a refresh credit timer, the refresh credit timer recurrently issuing credits for the first lookup credit account to replenish the first lookup credit account.

9. The packet network device of claim 2, wherein the credit manager caps the lookup credit account at a maximum credit.

10. The packet network device of claim 1, wherein once the backpressure threshold circuit signals the backpressure channel to request a reduction in the relative rate of packets, the backpressure threshold circuit will signal an increase in the relative rate of packets when the value of the first lookup credit account rises above an upper threshold.

11. The packet network device of claim 1, wherein the packet port buffers reside on a first integrated circuit and the lookup engine resides on a second integrated circuit, the packet network device further comprising:
   the arbiter on the first integrated circuit to select packet data from the multiple packet port buffers for transmission to the second integrated circuit;
   a forward data bus connected from the first integrated circuit to the second integrated circuit, the forward data bus transmitting the packet data selected by the arbiter to the second integrated circuit; and
   a reverse status bus connected from the second integrated circuit to the first integrated circuit, the backpressure channel operating over the reverse status bus to notify the arbiter of requests for reduction in the relative rate of packets selected from the first packet port buffer.

12. The packet network device of claim 11, the second integrated circuit further comprising a status manager for the reverse status bus, the status manager merging the backpressure channel requests with requests for relative packet rate changes based on criteria other than lookup engine resource usage.

13. A method of operating a packet network device, the method comprising:
   assigning a lookup credit to at least one of a plurality of packet port buffers comprising the packet network device, the lookup credit is a relative cost associated with lookup operations performed by a lookup engine over a fixed period of time on a packet data type;
   maintaining a lookup credit account for tracking the relative costs associated with the lookup engine usage by at least a first packet port buffer;
   performing lookup operations for packet data selected from the multiple port buffers, using the results of the lookup operations to modify at least some of the packet data and storing the cost of the lookup operations in the lookup credit account associated with the at least one packet port buffer; and
   reducing the relative rate of packets submitted to the lookup engine from the first one of the plurality of packet port buffers when the lookup credit value in the lookup credit account assigned to that buffer fall below a lower credit threshold.

14. The method of claim 13, wherein the relative rate of packets submitted to the lookup engine is reduced to zero when the lookup credit account assigned to that buffer falls below the lower credit limit.

15. The method of claim 13, wherein tracking lookup resource usage comprises maintaining a first credit account for the first packet port buffer, and adjusting the value of the first credit account by a lookup cost when lookup resources are consumed by a packet from the first packet port buffer.

16. The method of claim 15, further comprising recurrently issuing credits to the first credit account at a rate related to an acceptable lookup resource usage profile for the first packet port buffer.

17. The method of claim 16, further comprising limiting the amount of credit that can be stored in the first credit account.

18. The method of claim 15, further comprising comparing the value of the first credit account to a first threshold and setting a backpressure condition when the value of the first credit account does not pass the first threshold, the backpressure condition affecting the arbitration success of the first packet port buffer.

19. The method of claim 18, further comprising, when the backpressure condition is set, comparing the value of the first credit account to a second threshold and clearing the backpressure condition when the value of the first credit account passes the second threshold.

20. The method of claim 15, wherein tracking lookup resource usage further comprises maintaining corresponding credit accounts for each packet port buffer, and, when lookup resources are consumed by a packet from one of the packet port buffers, adjusting the value of a corresponding credit account by a lookup cost.

21. The method of claim 15, further comprising calculating the lookup cost based on a number of clock cycles required to complete lookup operations for a packet.

22. The method of claim 15, further comprising classifying a packet according to a packet type, and estimating the lookup cost for the packet according to the packet type.

23. The method of claim 22, wherein estimating the lookup cost comprises storing estimated lookup costs in a cost lookup table indexed by packet type, and indexing the cost lookup table using the packet type to obtain a lookup cost.

* * * * *